(12) United States Patent
Hron

(10) Patent No.: US 10,713,146 B2
(45) Date of Patent: Jul. 14, 2020

(54) DYNAMIC BINARY TRANSLATION AND INSTRUMENTATION WITH POSTPONED ATTACHMENT TO RUNNING NATIVE THREADS

(71) Applicant: Avast Software s.r.o., Prague (CZ)

(72) Inventor: Martin Hron, Zelesice (CZ)

(73) Assignee: Avast Software s.r.o., Prague (CZ)

( * ) Notice: Subject to any disclaimer, the term of this patent is extended or adjusted under 35 U.S.C. 154(b) by 319 days.

(21) Appl. No.: 15/192,411

(22) Filed: Jun. 24, 2016

(65) Prior Publication Data

US 2016/0378640 A1  Dec. 29, 2016

Related U.S. Application Data

(60) Provisional application No. 62/185,475, filed on Jun. 26, 2015.

(51) Int. Cl.
*G06F 11/36* (2006.01)
*G06F 8/52* (2018.01)

(52) U.S. Cl.
CPC ............ *G06F 11/3644* (2013.01); *G06F 8/52* (2013.01); *G06F 11/3612* (2013.01); *G06F 11/3636* (2013.01)

(58) Field of Classification Search
CPC . G06F 21/566; G06F 11/3466; H04L 63/1416
See application file for complete search history.

(56) References Cited

U.S. PATENT DOCUMENTS

| | | | | |
|---|---|---|---|---|
| 8,176,488 B1* | 5/2012 | Dobrovolskiy | ..... | G06F 11/3644 710/260 |
| 8,327,354 B1* | 12/2012 | Magenheimer | ..... | G06F 9/45554 711/206 |
| 9,424,427 B1* | 8/2016 | Chiriac | ................. | G06F 21/566 |
| 9,448,788 B1* | 9/2016 | Barua | ....................... | G06F 8/70 |
| 2006/0123244 A1* | 6/2006 | Gheorghescu | ........ | G06F 21/563 713/188 |
| 2006/0184919 A1* | 8/2006 | Chen | ................... | G06F 9/45516 717/127 |
| 2009/0320011 A1* | 12/2009 | Chow | ................. | G06F 11/3612 717/154 |
| 2010/0274551 A1* | 10/2010 | Das | ...................... | G06F 9/45504 703/26 |
| 2010/0299665 A1* | 11/2010 | Adams | ................ | G06F 9/45533 718/1 |
| 2014/0281376 A1* | 9/2014 | Yamada | ............... | G06F 9/3885 712/28 |
| 2014/0282431 A1* | 9/2014 | Delio, Jr. | ...................... | 717/130 |

(Continued)

OTHER PUBLICATIONS

Hron et al. "SafeMachine malware needs love, too." Sep. 24, 2014. Avast, VB Seattle 2014.*
Josse, Sebastien et al. "Malware Dynamic Recompilation." Jan. 2014. System Sciences (HICSS), 2014 47th Hawaii International Conference on. IEEE, 2014.*
Hron, Martin et al. "SafeMachinennalware needs love, too". 2014. vb-Seattle. pp. 1-3. (Year: 2014).*

(Continued)

*Primary Examiner* — Lewis A Bullock, Jr.
*Assistant Examiner* — Gilles R Kepnang
(74) *Attorney, Agent, or Firm* — Erickson Kernell IP, LLC

(57) ABSTRACT

Dynamic binary instrumentation (DBI) or dynamic binary translation (DBT) of an examined process can be postponed until a point of interest is reached. Portions of the examined process can be run in native mode until the point of interest is reached. Upon reaching the point of interest, DBI and/or DBT can be performed.

18 Claims, 3 Drawing Sheets

(56) References Cited

U.S. PATENT DOCUMENTS

| | | | | |
|---|---|---|---|---|
| 2015/0067763 A1* | 3/2015 | Dalcher | ................ | G06F 21/566 |
| | | | | 726/1 |
| 2015/0178497 A1* | 6/2015 | Lukacs | .................. | G06F 9/461 |
| | | | | 726/23 |
| 2016/0094571 A1* | 3/2016 | Sahita | ................ | H04L 63/1416 |
| | | | | 726/23 |
| 2016/0180089 A1* | 6/2016 | Dalcher | ................ | G06F 21/566 |
| | | | | 726/23 |
| 2016/0188372 A1* | 6/2016 | Sarkar | ................ | G06F 9/45516 |
| | | | | 718/103 |
| 2016/0224789 A1* | 8/2016 | Feroz | .................... | G06F 21/566 |
| 2016/0378446 A1* | 12/2016 | Ince | .......................... | G06F 8/52 |
| | | | | 717/136 |

OTHER PUBLICATIONS

Zeng, Junyuan, Yangchun Fu, and Zhiiiiang Lin. "Pemu: A pin highly compatible out-of-vm dynamic binary instrumentation framework." 2015. Proceedings of the 11th ACM SIGPLAN/SIGOPS International Conference on Virtual Execution Environments. (Year: 2015).*

Naftaly, S., Pin—A Dynamic Binary Instrumentation Tool, Jun. 13, 2012, pp. 1-2, https://software.intel.com/en-us/articles/pin-a-dynamic-binary-instrumentation-tool, Accessed Sep. 23, 2016.

Pin 3.0 User Guide, pp. 1-48, https://software.intel.com/sites/landingpage/pintool/docs/76991/Pin/html/, Accessed Sep. 26, 2016.

Pin OS-APIs User Guide, pp. 1-2, https://software.intel.com/sites/landingpage/pintool/docs/76991/PinCRT/html/, Accessed Sep. 26, 2016.

* cited by examiner

DYNAMIC BINARY TRANSLATION AND INSTRUMENTATION WITH POSTPONED ATTACHMENT TO RUNNING NATIVE THREADS

CROSS-REFERENCE TO RELATED APPLICATIONS

This Application claims priority to U.S. Provisional Patent Application Ser. No. 62/185475, filed on Jun. 26, 2015, to Martin Hron, entitled "Dynamic Binary Translation and Instrumentation with Postponed Attachment to Running Native Threads," the entire disclosure of which is incorporated herein by reference.

FIELD OF THE INVENTION

The disclosure relates generally to binary translation of running native threads, and more particularly, postponing attachment to running native during binary translation and instrumentation of the native thread.

BACKGROUND OF THE INVENTION

A common method of analyzing running executable programs is dynamic binary translation (DBT) or dynamic binary instrumentation (DBI) of the executable program. In DBT, the executable instructions are translated and emulated. In DBI, execution time statistics or characteristics can be obtained. Thus, DBT and DBI of a running executable program can be useful for testing and debugging features of the program or for detecting hot spots or bottlenecks in the program. Conventional DBT and DBI software frameworks typically causes DBI and/or DBT to be performed on the entire executable. While DBT and DBI can be useful for such activities, the utility comes at a cost. The overhead of translation, emulation and/or instrumentation can easily double the execution time of a program.

SUMMARY OF THE INVENTION

Systems and methods enable dynamic binary instrumentation (DBI) or dynamic binary translation (DBT) of an examined process to be postponed until a point of interest is reached. Portions of the examined process are run in native mode until the point of interest is reached. Upon reaching the point of interest, DBI and/or DBT is performed.

More particularly, systems and methods enable examining a process comprised of a binary executable that is comprised of plurality of executable threads. The process includes a guest and a host. The guest is native executable binary code for the examined process. In other words, guest is the executable code in an un-translated and un-instrumented form. Host is an environment for guest and is used for performing at least one of binary translation and binary instrumentation.

A first hook and a point of interest hook are set in the binary executable. Execution of the binary executable is started in guest. Upon execution in guest of the first hook, a context structure for a thread of the binary executable running in guest is established. Upon execution in guest of the point of interest hook, control of the process being examined is transferred to the module for performing at least one of said binary translation and said binary instrumentation.

DESCRIPTION OF THE SEVERAL VIEWS OF THE DRAWING

For a better understanding of the inventive subject matter, reference may be made to the accompanying drawings in which.

DETAILED DESCRIPTION OF THE INVENTION

Figure 1:
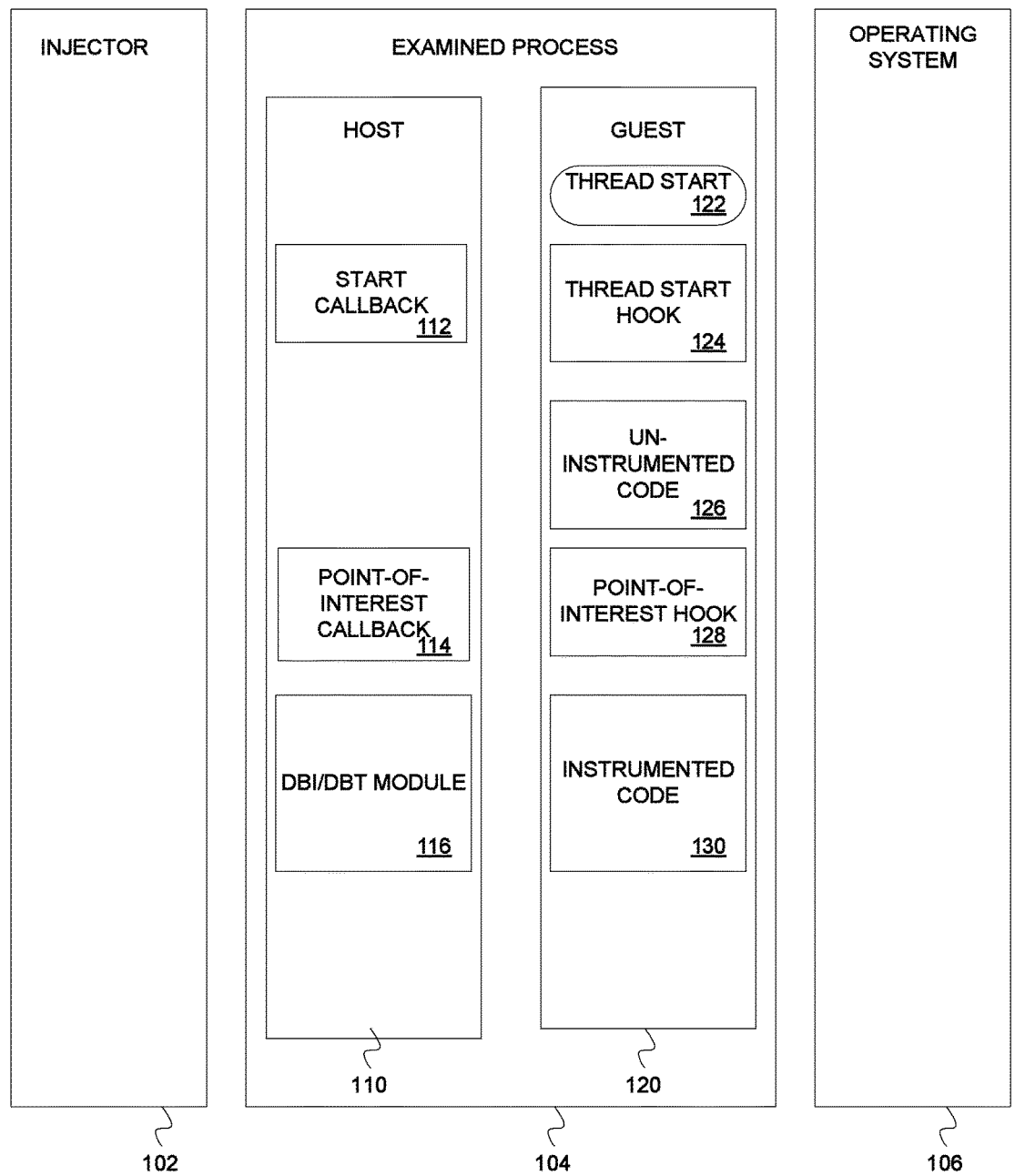
FIG. 1 is a block diagram of an operating environment for a system that performs binary translation of a running native thread.

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

FIG. 1 is a block diagram of an operating environment for a system 100 that performs DBT and/or DBI of a running native thread. According to some embodiments, system 100 includes an injector 102, an examined process 104, and an operating system 106. Operating system 106 can be any operating system now known or developed in the future. For example, operating system 106 can be a version of the Linux operating system, a version of the UNIX operating system, or a version of the Microsoft Windows family of operating systems. The aspects of the disclosure are not limited to any particular operating system.

Injector 102 can be an application that is used to initiate a DBI/DBT session for an examined process 104. In some aspects, injector 102 causes an examined process 104 to be loaded by operating system 106.

Examined process 104 is a process where portions of the process or threads of the process will be subject to DBI and/or DBT. In some aspects, examined process 104 includes a host 110 and a guest 120. Guest 120 is the native executable binary code for the examined process 104. In other words, guest 120 comprises the un-translated binary executable code for the process examined process 104.

Host 110 provides an emulation and analysis environment for guest 120 of examined process 104. Host 110 includes callbacks and DBI/DBT module 116. DBI/DBT module 116 can provide block level translation, emulation, and/or instrumentation of blocks of binary executable code of guest 120. A block of binary code is a group of executable instructions. The group may comprise a block of code within a loop, a block of code for a function etc. In some aspects of the disclosure, DBI/DBT module 116 analyzes blocks of code to determine or detect malware patterns in the blocks of code.

During operation, injector 102 causes the operating system 106 to load the examined process 104 into memory. In addition, injector 102 sets a thread start hook 124 and a point of interest hook 128 into guest 120. As used herein, a hook is a modification to a binary executable that alters or augments the programmed behavior of the binary executable. In some aspects, a hook can be implemented using a callback function. However, those of skill in the art will appreciate that a hook may be implemented in other ways. The thread start hook 124 causes control to be transferred from guest 120 to start callback 112 of host 110. The point-of-interest hook causes control to be transferred to point-of-interest callback 114 in host 110. The point-of-interest callback 114 can cause DBT and/or DBI to be initiated for examined process 104.

Figure 2:
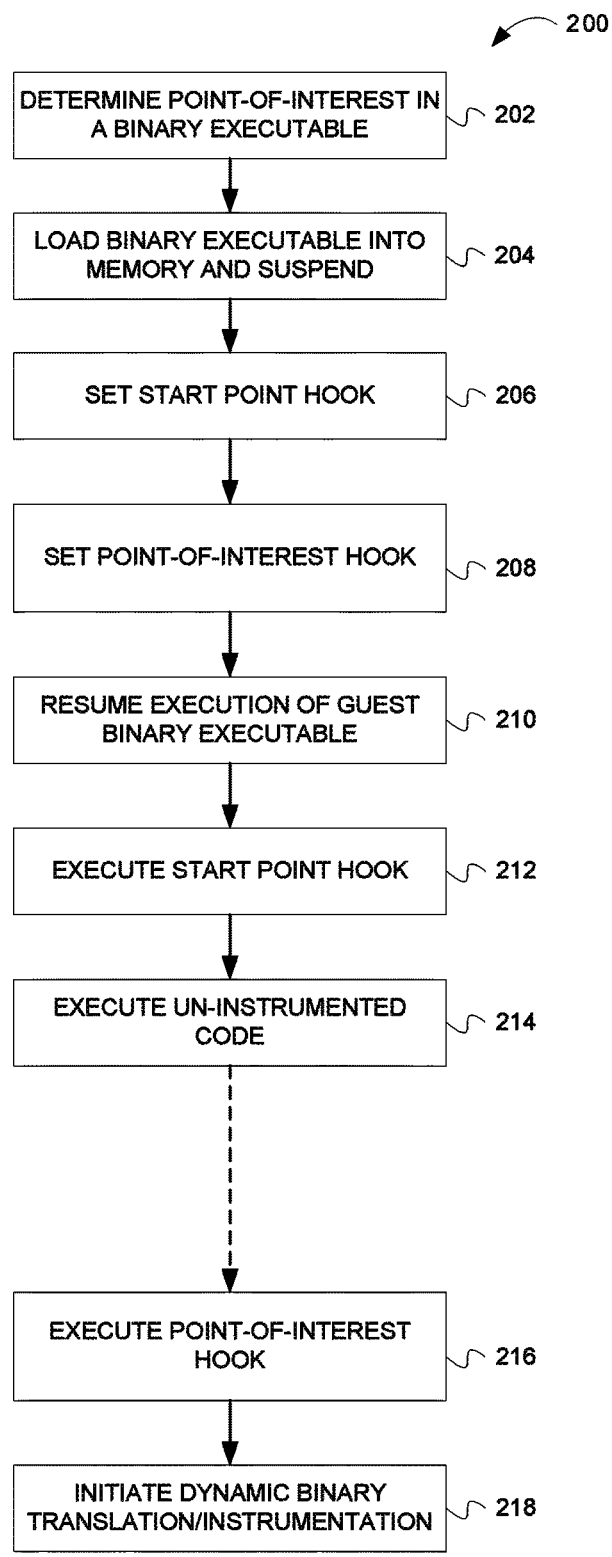
FIG. 2 is a flow chart illustrating operations of a method to perform binary translation of a running native thread.

Further details on the operation of system 100 will now be provided with reference to FIG. 2.

FIG. 2 is a flow chart 200 illustrating operations of a method to perform binary translation of a running native thread.

At block 202, a point-of-interest is determined for a binary executable. In some aspects of the disclosure, the point-of-interest can be the main entry point for the binary executable. In many programming languages, a function or method labeled "main" defines the main entry point for a program. Thus, after standard initialization code is executed, the main entry point is called.

At block 204, injector 102 causes an operating system 106 to load a binary executable for guest 120 of examined process 104 into memory. In some aspects of the disclosure, the binary executable is suspended upon loading so that it does not begin execution.

At block 206, injector 102 sets a start point hook in guest 102. The start point hook can be a thread start hook 124. In some aspects, the start point hook comprises code that, when executed, causes the flow of control of examined process 104 to be transferred from guest 120 to host 110 of examined process 104. In particular aspects, the start point hook, when executed, causes a start callback 112 of host 110 to be called.

At block 208, injector 102 sets a point-of-interest hook 128 in guest 102. The location of the point-of-interest hook can be determined as described for block 202. In some aspects, the point-of-interest hook comprises code that, when executed, causes the flow of control of examined process 104 to be transferred from guest 120 to host 110 of examined process 104. In particular aspects, the point-of-interest hook, when executed, causes a point-of-interest callback 114 of host 110 to be called.

At block 210, injector 102 causes guest 120 to resume execution. In some aspects, injector 102 can make system calls to operating system 106 to cause guest 120 to resume execution. In some aspects, resuming execution can cause a first thread of guest 102 to begin execution at a thread start point 122.

At block 212, the thread start hook 124 is reached and executed after guest 120 resumes execution. In some aspects, execution of the thread start hook 124 causes start callback 112 to be executed. Start callback 112 can create a context structure for the examined process 104. The context structure can hold information about the thread being executed. For example, the context data can include processor state (e.g., register values) at the time a switch is made from native mode execution to execution under DBI/DBT.

The context structure can be added to a list of natively executed threads that have contexts associated with them. In some aspects, the list is a thread-safe list that can be coherently maintained in an environment where multiple threads may access the list. The presence of a context structure in the list can be an indicator that the thread should be switched to execution in DBI/DBT mode once the point of interest is reached.

At block 214, control is returned to the guest 120, which begins to execute un-instrumented code 126. The un-instrumented code 126 of a thread runs as native binary code, and is thus not translated, emulated, or instrumented. As a result, it runs at normal execution speed. In some aspects, the un-instrumented code can be process or thread initialization code that is typically not susceptible to malware attacks. Un-instrumented code 126 executes until point-of-interest hook 128 of a thread is reached.

At block 216, the point-of-interest hook 128 is reached and executed. In some aspects, this causes point-of-interest callback 114 of host 110 to be executed. The point-of-interest callback 114 can freeze the threads of guest 102, and get state information for the threads. The state information can include CPU states, register states, stack states etc.

At block 218, the point-of-interest callback 114 can then run each thread of guest 102 under the control of DBI/DBT module 116, thereby switching the mode of examined process 104 from native mode to DBI/DBT mode. In this mode, blocks of code are translated and/or instrumented. In some aspects, the blocks of code can be analyzed to determine or detect malware patterns in the blocks of code. In some aspects, a block of code (also referred to as a "basic block") is a block of code that comprises a contiguous block of instructions that ends with a change in the flow of control. For example, a block may be terminated by a jump, call, syscall etc. The change in flow of control may lead to a loss of control of the DBI/DBT module 116. In some aspects, a the instrumented code is run block by block, where at the end of each block, control is returned to the DBI/DBT module 116.

As can be seen from the above, the systems and methods described herein provide a means for postponing performance of DBI/DBT on an examined process until a point of interest is reached. As a result, the execution time of the examined process is improved over conventional DBI/DBT frameworks. Thus some embodiments can provide a way to perform DBT and/or DBI on an executable within a set time frame. As a result, it can be practical to use DBT and/or DBI to detect malware patterns when an application or other executable is run. For example, DBI and/or DBT can be bypassed for process initialization code, which is typically not as vulnerable to malware attacks as other portion of a process. DBI and/or DBT can be performed for a point of interest, such as the entry point of a process, which is more likely to contain malware or anti-emulation techniques (e.g., code that attempts to avoid emulation/instrumentation by a DBI/DBT module or anti-malware code). Further, DBI/DBT can be bypassed for sections of code that do not contain instructions that may potentially cause a change in the flow of control of a thread and thus can be safely run natively.

It should be noted that there can be multiple points-of-interest in a process or in the threads of a process. The systems and methods described above can be used to set multiple point-of-interest hooks in a process that can be used to turn DBI and/or DBT on or off as desired. For example, upon reaching one of the points of interest, each of the threads in the list of threads for which context information is available can be placed in a frozen state. The thread can then be run under the control of DBI/DBT module 116. Safe code sequences can be run in native mode (i.e., without DBI and DBT), thereby increasing the performance of the DBI/DBT framework.

Figure 3:
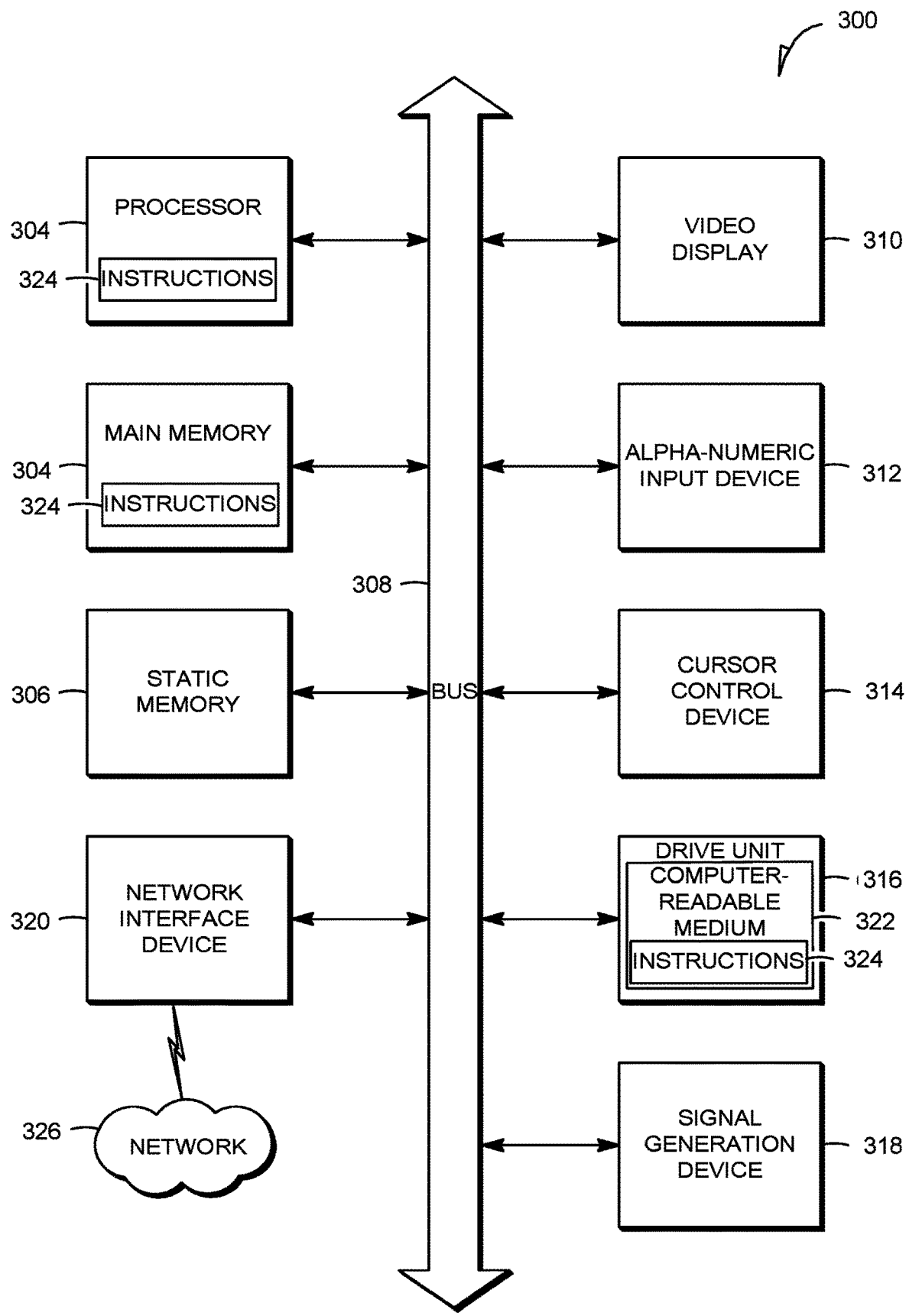
FIG. 3 is a block diagram of an example embodiment of a computer system upon which embodiments of the inventive subject matter can execute.

FIG. 3 is a block diagram of an example embodiment of a computer system 300 upon which embodiments of the inventive subject matter can execute. The description of FIG. 3 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As noted above, the system as disclosed herein can be spread across many physical hosts. Therefore, many systems and sub-systems of FIG. 3 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

With reference to FIG. 3, an example embodiment extends to a machine in the example form of a computer system 300 within which instructions for causing the machine to perform any one or more of the methodologies discussed herein may be executed. In alternative example embodiments, the machine operates as a standalone device or may be connected (e.g., networked) to other machines In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 300 may include a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). In example embodiments, the computer system 300 also includes one or more of an alpha-numeric input device 312 (e.g., a keyboard), a user interface (UI) navigation device or cursor control device 314 (e.g., a mouse), a disk drive unit 316, a signal generation device 318 (e.g., a speaker), and a network interface device 320.

The disk drive unit 316 includes a machine-readable medium 322 on which is stored one or more sets of instructions 324 and data structures (e.g., software instructions) embodying or used by any one or more of the methodologies or functions described herein. The instructions 324 may also reside, completely or at least partially, within the main memory 304 or within the processor 302 during execution thereof by the computer system 300, the main memory 304 and the processor 302 also constituting machine-readable media.

While the machine-readable medium 322 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 324 may further be transmitted or received over a communications network 326 using a signal transmission medium via the network interface device 320 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. §1.72(b) to allow the reader to quickly ascertain the nature and gist of the technical disclosure. The Abstract is submitted with the understanding that it will not be used to limit the scope of the claims.

What is claimed is:
1. A method comprising:
  determining an entry point in a binary executable, the binary executable previously executed in a native mode;
  causing the binary executable to be loaded into memory, wherein the binary executable is suspended upon said loading into memory;
  setting a start point hook at a start point of the binary executable;
  setting a point-of-interest hook at the determined entry point;
  resuming execution of the binary executable in the native mode, after setting the point-of-interest hook, until the execution reaches the start point hook; and
  in response to the point-of-interest hook being executed;
    initiating binary translation of the binary executable after execution of the point-of-interest hook by switching a mode of execution for the binary executable from the native mode to a dynamic binary translation mode corresponding to the binary translation; and
    while in the dynamic binary translation mode, performing the binary translation of the binary executable by analyzing blocks of code associated with the binary executable and detecting malware patterns for the analyzed blocks of code.

2. The method of claim 1, further comprising suspending the binary executable upon loading of said binary executable into memory so that execution of said binary executable does not begin.

3. The method of claim 1, wherein said binary executable is at least part of a process comprising a guest and a host, and further wherein, in response to said start point hook being executed, said method comprises transferring a flow of control of said binary executable from said guest to said host.

4. The method of claim 3, further comprising, in response to the start point hook being reached and executed, setting a context for the binary executable of the process, wherein said setting context further comprises establishing, in said host, a context data structure for storing context information indicative of a state of a thread of said process being executed at a time that a control of said process including said thread is transferred from said guest to said binary translation in said host.

5. The method of claim 4, further comprising adding said context data structure indicative of said set context to a list of threads executed in said guest that have context associated with them.

6. The method of claim 5, further comprising using the presence of said context structure in said list as an indication that said binary executable should be executed by said binary translation.

7. The method of claim 5, wherein said host comprises a point-of-interest callback, wherein, in response to the second hook being executed, said point-of-interest callback of said host is executed, and wherein said point-of-interest callback hafts execution of the binary executable in guest.

8. The method of claim 7, wherein said point-of-interest callback further obtains information indicative of a state associated with said binary executable, and wherein said state comprises at least one of a CPU state, a register state, and a stack state.

9. The method of claim 3, said method comprising, before said step of starting execution of said binary executable in said guest, first loading said binary executable in a memory and then delaying said step of starting execution of said binary executable in said guest until a time after said first hook and said point-of-interest hook have been set.

10. The method of claim 1, wherein said method comprises, in response to said point-of-interest hook being executed, initiating binary instrumentation of the binary executable that is executed after the hook, and using said binary instrumentation to detect a malware pattern of said binary executable.

11. The method of claim 1 wherein said binary executable comprises a plurality of code sections, wherein said method further comprises performing said binary translation on a code section that is executed after the point-of-interest hook, wherein a code section of said plurality of code sections comprises instructions that do not enable a change in a flow of control of a thread of said binary executable, and wherein said method further comprises bypassing binary translation for said code section comprising instructions that do not enable a change in a flow of control of a thread.

12. The method of claim 1, wherein initiating binary translation of the binary executable that is executed after the point-of-interest hook comprises initiating at least one of binary translation of the binary executable that is executed after the entry point is reached.

13. The method of claim 1, wherein said point-of-interest hook comprises a first point-of-interest hook, said method further comprising setting a plurality of additional point-of-interest in said binary executable, and wherein each said additional point-of-interest comprises a hook that enables changing an on/off state of a module for controlling at least one of said binary translation.

14. The method of claim 1, wherein said binary executable comprises a plurality of threads, wherein each said thread of said plurality of threads has correspondingly available context information, and wherein said method further comprises, upon reaching a point-of-interest in one of said threads in said plurality of threads when executing said binary executable, placing said one of said threads in a frozen state and performing said binary translation on said one of said threads.

15. The method of claim 1, wherein said binary executable further comprises a plurality of code sections, wherein said plurality of code sections comprises a subset of code sections, wherein each code section in said subset of code sections is categorized as a safe code sequence, and wherein said method further comprises bypassing said binary translation for said categorized safe code sequences in said subset of code sections.

16. The method of claim 1, wherein said binary executable further comprises a plurality of code sections, wherein said plurality of code sections comprises a subset of code sections, wherein each code section in said subset of code sections is categorized as a safe code sequence, and wherein said method further comprises running said safe code sequences in a native mode without implementing binary translation.

17. A system comprising:
one or more processors executing instructions for performing the steps of:
determining an entry point in a binary executable, the binary executable previously executed in a native mode;
causing the binary executable to be loaded into memory, wherein the binary executable is suspended upon said loading into memory;
setting a start point hook at a start point of the binary executable;
setting a point-of-interest hook at the determined entry point;
resuming execution of the binary executable in the native mode, after setting the point-of-interest hook, until the execution reaches the start point hook; and
in response to the point-of-interest hook being executed:
initiating binary translation of the binary executable after execution of the point-of-interest hook by switching a mode of execution for the binary executable from the native mode to a dynamic binary translation mode corresponding to the binary translation; and
while in the dynamic binary translation mode, performing the binary translation of the binary executable by analyzing blocks of code associated with the binary executable and detecting malware patterns for the analyzed blocks of code.

18. A non-transitory machine-readable medium storing instructions that when executed on a processor performing the steps of:
determining an entry point in a binary executable, the binary executable previously executed in a native mode;
causing the binary executable to be loaded into memory, wherein the binary executable is suspended upon said loading into memory;
setting a start point hook at a start point of the binary executable;
setting a point-of-interest hook at the determined entry point;
resuming execution of the binary executable in the native mode, after setting the point-of-interest hook, until the execution reaches the start point hook; and
in response to the point-of-interest hook being executed:
initiating binary translation of the binary executable after execution of the point-of-interest hook by switching a mode of execution for the binary executable from the native mode to a dynamic binary translation mode corresponding to the binary translation; and
while in the dynamic binary translation mode, performing the binary translation of the binary executable by analyzing blocks of code associated with the binary executable and detecting malware patterns for the analyzed blocks of code.

* * * * *